Oct. 30, 1962    W. D. ELENBURG    3,061,272
SHOCK ABSORBER FOR CABLE TOOL DRILLING RIGS
Filed March 17, 1961                         2 Sheets-Sheet 1
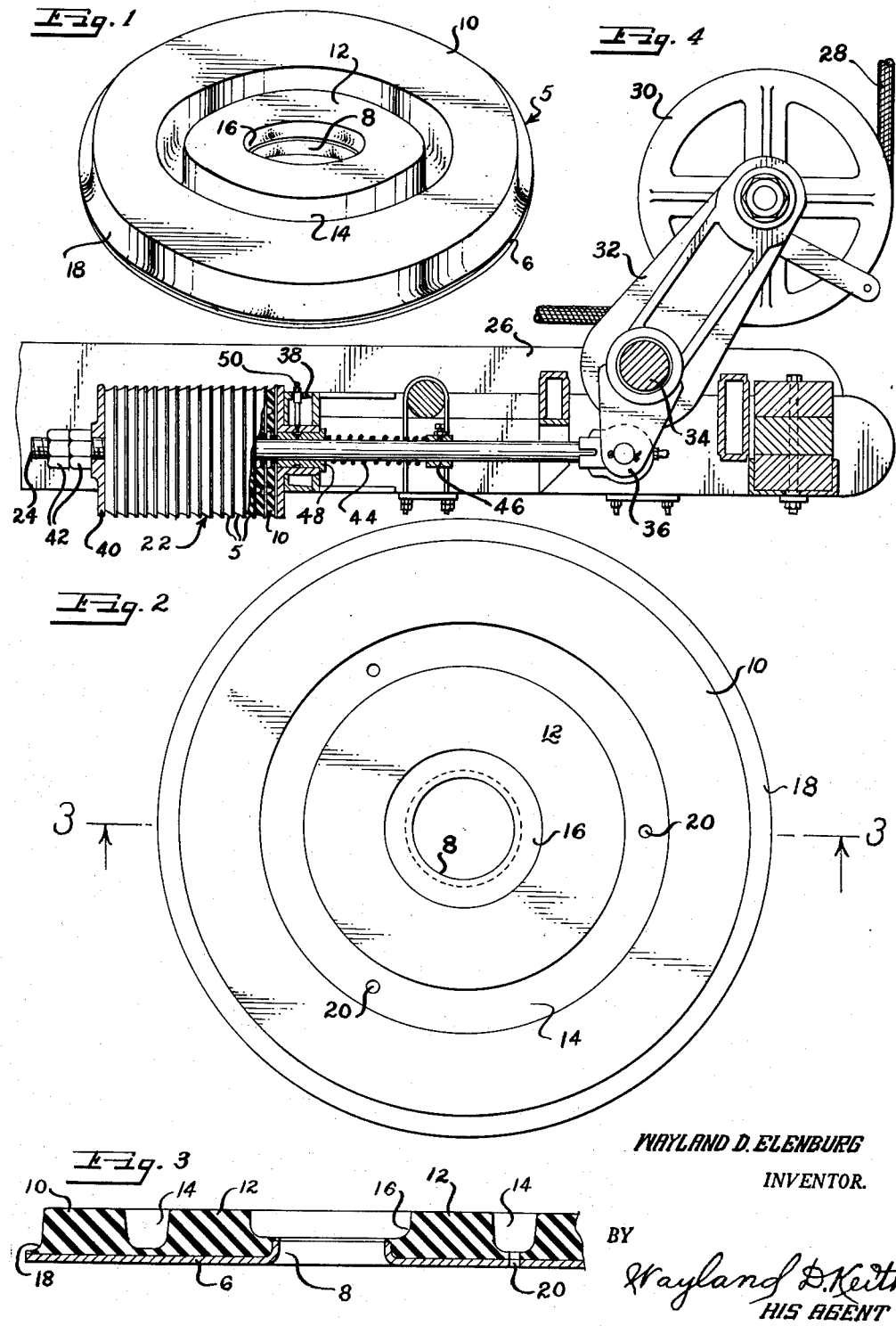
WAYLAND D. ELENBURG
INVENTOR.
BY
Wayland D. Keith
HIS AGENT Oct. 30, 1962 W. D. ELENBURG 3,061,272
SHOCK ABSORBER FOR CABLE TOOL DRILLING RIGS
Filed March 17, 1961 2 Sheets-Sheet 2

WAYLAND D. ELENBURG
INVENTOR.

BY
Wayland D. Keith
HIS AGENT.

United States Patent Office 3,061,272
Patented Oct. 30, 1962

3,061,272
SHOCK ABSORBER FOR CABLE TOOL
DRILLING RIGS
Wayland D. Elenburg, % Walker-Neer Mfg. Co.,
P.O. Box 2490, Wichita Falls, Tex.
Filed Mar. 17, 1961, Ser. No. 96,474
2 Claims. (Cl. 254—190)

This invention relates to improvements in shock absorbers and more particularly to shock absorbers for cable tool drilling rigs, such as spudders and the like.

Various shock absorbers for cable tool drilling rigs have been proposed heretofore, but these, for the most part, were complex in structure and expensive to manufacture.

The present device utilizes a plurality of elastomer discs, the elastomer material of each disc being bonded to a metallic backing plate, which metallic backing plate and the elastomer disc bonded thereto are each centrally apertured. An annular corrugation or groove is disposed between the central aperture and the periphery of the elastomer disc so as to form a void for the flexing of the elastomer material during the use of the shock absorber.

It is preferable to have the elastomer material formed of rubber, synthetic rubber, or of material which will regain or substantially regain its original shape after being compressed. The present elastomer shock absorber disc is planar in shape so as to more evenly distribute the compressive load on the disc, which obviates deforming the metallic back-up plate to which the elastomer material is bonded.

An object of this invention is to provide an elastomer shock absorber element which will absorb the shock of high impact forces over a long period of time.

Another object of the invention is to provide an elastomer spring of a construction that will absorb severe shock without material disintegration of the bond between the elastomer material and the planar metallic disc.

Still another object of the invention is to provide an elastomer shock absorber element which may be readily assembled in multiple to provide such shock absorbing qualities as desired.

Yet another object of this invention is to provide a shock absorber element which is simple in construction, low in the cost of manufacture, which is easy to install and to remove, but which will offer a maximum of salvage for rebuilding.

With these objects in mind and others which will become manifest as the description proceeds, reference is to be had to the accompanying drawings in which like reference characters designate like parts in the several views thereof, in which:

FIG. 1 is a perspective view of the shock absorber disc shown apart from the shock absorber;

FIG. 2 is a plan view of the shock absorber disc;

FIG. 3 is a fragmentary, sectional view taken on the line 3—3 of FIG. 2, looking in the direction indicated by the arrows;

FIG. 4 is a fragmentary, longitudinal sectional view, with parts being broken away and with parts shown in elevation, of a spudding arm and spudding arm mechanism of a cable tool drilling rig, showing the present shock absorber installed thereon, with parts being shown in elevation, and with parts being broken away and with parts shown in section to bring out the details of construction.

Figure 5:
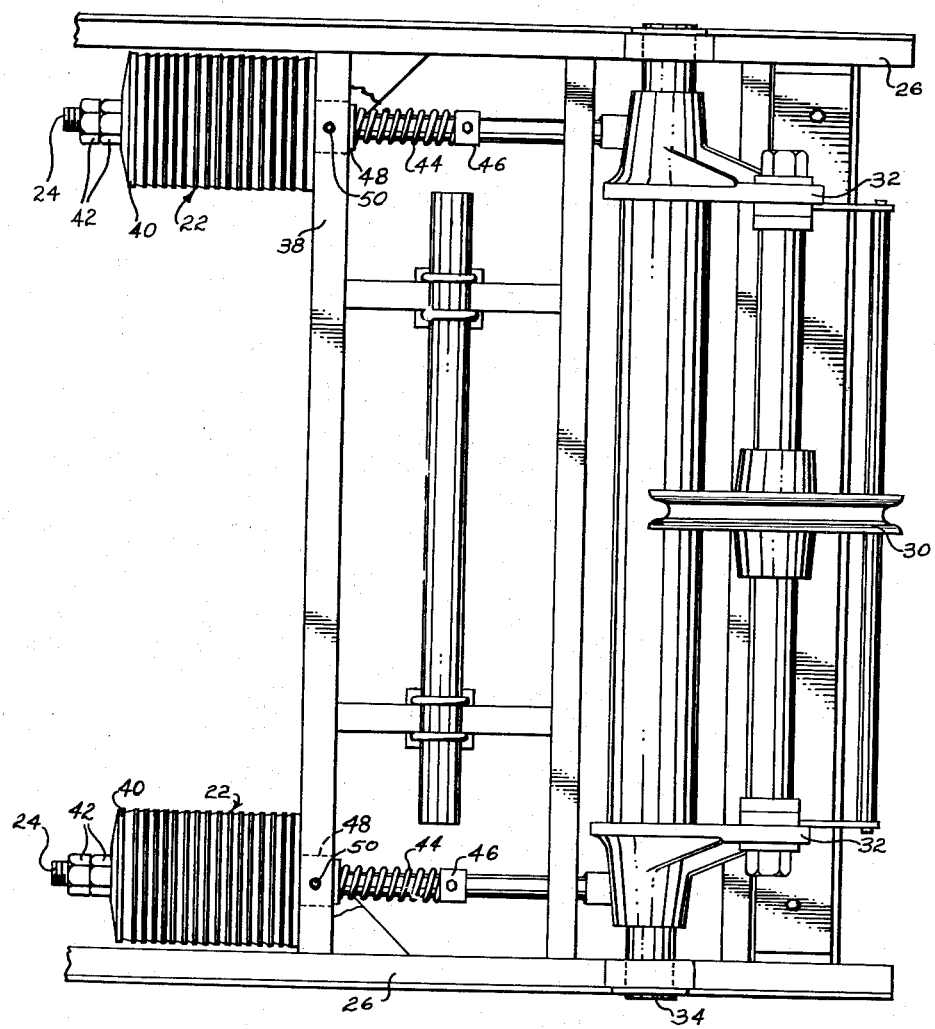
FIG. 5 is a fragmentary top plan view of the spudder arms, showing shock absorber elements installed thereon.

With more detailed reference to the drawing the numeral 5 designates generally a shock absorber disc of elastomer material, such as rubber, synthetic rubber or the like, which material is bonded to a substantially planar metallic disc 6, which disc is centrally apertured as indicated at 8. The shock absorber disc has two annular bosses 10 and 12 which are formed thereon and bonded thereto and being concentric with respect to aperture 8.

The respective annular bosses 10 and 12 are spaced apart to form an annular groove 14 therebetween, with a recess 16 formed centrally of the elastomer shock absorber disc 5 and interconnecting with aperture 8. The metallic disc 6 has the periphery thereof extending to a point exterior of annular boss 10, with the elastomer material sloping downwardly and outwardly, with a concave fillet 18 formed around the outer periphery adjacent the metal disc 6.

Elastomer spring elements often become loosened from the metal to which they are bonded, due to the great mass of rubber, synthetic rubber or the like, being bonded over a great area of metal, as the volume of most elastomers change approximately 0.023 percent per degree of Fahrenheit) or total reduction of about 5% from curing temperature to room temperature. In the present device, the shrinkage bond has been greatly enhanced by utilizing relatively narrow valleys or recesses 14 between masses, to lessen the cooling stress between adjacent masses of elastomer material to produce better bonding of the annular bosses to the planar disc.

The walls on each side of annular groove 14 slope upwardly and outwardly from the bottom thereof, as viewed in FIG. 3, with a rounded fillet between the bottom of the recess 14 and the respective walls. At circularly spaced intervals, apertures 20 are formed through the elastomer material and through the metallic disc 6 so as to provide for circulation of air within the respective annular grooves 14 of the shock absorber, designated generally at 22, when the elastomer disc units are assembled together as shown in FIG. 4.

By having the shock absorber element 5 formed with a flat planar surface and with annular rings 10 and 12 of elastomer material bonded to the flat disc 6, the cushioning of the shock is distributed evenly over the entire surface of the shock absorber, which will cause a flexing of the elastomer material of the annular rings 10 and 12, through a short duration of compression. However, the elastomer material, which has spread outward on each side of the annular bosses 10 and 12, then will become relatively dense, but not before the shock of the impact has become cushioned.

With the elastomer disc 5 slid onto a linearly movable rod 24, such as used on spudding arms and the like, of drilling rigs, such as shown in FIG. 4, the sudden shock of picking up the heavy weight of a set of cable drill tools by spudding arms 26, causes the cable 28 to transfer the shock through the sheave 30, lever 32 to spudding arm shaft 34, thence to lever 36 to which linearly movable rod 24 is attached. However, a transverse abutment 38 is secured to the spudding arms 26, so as to form an abutment for shock absorber disc 5, when the lever 36 moves the rod in the shock absorber element 5, which in turn, will cause disc element 40, which is secured to rod 24 by nuts 42 to compress the elastomer disc elements 5 to cushion the shock of picking up the tools of a cable tool drilling rig. A spring 44 is telescoped over rod 24, on the opposite side of abutment 38 from elastomer elements 5, with one end of said spring being in abutting relation with the abutment. The spring is of the compressive type, with the other end thereof being held against movement by set collar 46. In this manner, the spring 44 will tend to move rod 24 in one direction, and the elastomer disc element 5 will tend to move rod 24 in the opposite direction, which will keep the elastomer disc elements 5 in close contact relation with the abutment 38, so as to prevent looseness and improper cushioning by the shock absorber 22, upon the spudding arms 26 picking up the cable tools as the spudding arms 26 move downward. A bushing 48 surrounds linearly movable rod 24, and in which bushing the rod is free to slide. The abutment 38 has a bushing 48 fitted therein with a lubrication fitting 50 fitted on the abutment 38 and being in fluid communication with the bore of bushing 48 to lubricate the rod 24 fitted therein.

While the invention has been illustrated and described in some detail, it is to be understood that changes may be made in the minor details of construction and adaptations made to different installations without departing from the spirit of the invention or the scope of the appended claims.

Having thus clearly illustrated and described the invention, what is claimed as new and desired to secure by Letters Patent is:

1. An elastomer shock absorber for cable tool drilling rigs comprising; a plurality of elastomer shock absorber elements, each of which elements has an aperture formed therethrough, a rod extending through said apertures of said plurality of elastomer shock absorber elements, which rod is movable linearly, said rod having an abutment formed on the outer end thereof, a pair of arcuately movable spudder arms, a second apertured abutment positioned between and secured to said spudder arms, said rod extending through the aperture of said second abutment and being slidable therein so said plurality of elastomer shock absorber elements will be in compression between said abutments, a transverse shaft mounted on said spudder arms, levers mounted on and movable with said transverse shaft, said linearly movable rod being connected to one of said levers, and a sheave mounted between and supported by other of said levers to receive a drilling tool cable within the lower grooved portion of said sheave, which levers mounting said sheave are at an angle to the direction at which force is applied to said sheave by the lifting of cable tools to transfer the impact of such force to said linearly movable rod to compress the elastomer shock absorber elements.

2. An elastomer shock absorber for cable tool drilling rigs comprising; a plurality of planar, metallic disc elements to each of which planar, metallic disc elements an elastomer material is bonded to form shock absorber elements, each of which has a central aperture formed therethrough, so said elastomer material will form a plurality of concentric bosses around said respective central apertures, a rod extending through said apertures of said plurality of shock absorber elements, which rod is movable linearly, said rod having an abutment formed on the outer end thereof, a pair of arcuately movable spudder arms, a second apertured abutment positioned between and secured to said spudder arms, said rod extending through the aperture of said second abutment and being slidable therein so said plurality of shock absorber elements will be in compression between said abutments, a transverse shaft mounted on said spudder arms, levers mounted on and movable with said transverse shaft, said rod being connected to one of said levers, a sheave mounted between and supported by other of said levers to receive a drilling tool cable within the lower grooved portion of said sheave, which other of said levers mounting said sheave are at an acute angle to the direction at which force is applied to said sheave by the lifting of cable tools so as to transfer the impact thereof to said linearly movable rod to compress the shock absorber elements, a further abutment on said rod intermediate the length thereof on the opposite side of said second abutment from said first abutment on the outer end of said rod, a spring slid over said rod betwen said second and said further abutments, which spring urges said rod into opposed relation to the resilient action of said shock absorber elements.

References Cited in the file of this patent
UNITED STATES PATENTS

| | | |
|---|---|---|
| 1,856,844 | Bieler | May 3, 1932 |
| 2,219,061 | Williams et al. | Oct. 22, 1940 |
| 2,693,953 | Munro et al. | Nov. 9, 1954 |
| 2,726,080 | Withall | Dec. 6, 1955 |